(12) United States Patent
Chang et al.

(10) Patent No.: US 11,733,743 B1
(45) Date of Patent: Aug. 22, 2023

(54) COMPUTER TACTILE PAD MECHANISM

(71) Applicant: Dell Products L.P., Round Rock, TX (US)

(72) Inventors: Yaotsung Chang, Taipei (TW); Tsan-Wei Liu, New Taipei (TW)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/864,991

(22) Filed: Jul. 14, 2022

(51) Int. Cl.
*G06F 3/041* (2006.01)
*G06F 1/16* (2006.01)
*G06F 3/0354* (2013.01)

(52) U.S. Cl.
CPC ............ *G06F 1/169* (2013.01); *G06F 1/1616* (2013.01); *G06F 3/03547* (2013.01); *G06F 3/041* (2013.01); *G06F 2203/04103* (2013.01)

(58) Field of Classification Search
CPC ...... G06F 1/1616; G06F 1/169; G06F 3/0219; G06F 3/03547; G06F 3/041; G06F 2203/04103; A63F 13/285
See application file for complete search history.

(56) References Cited

U.S. PATENT DOCUMENTS

| | | | | |
|---|---|---|---|---|
| 6,177,924 B1* | 1/2001 | Bae | ......................... | G06F 1/169 345/157 |
| 7,486,278 B2* | 2/2009 | Sun | ......................... | G06F 1/169 345/173 |
| 8,633,916 B2* | 1/2014 | Bernstein | ............... | G06F 1/1662 345/174 |
| 8,803,852 B2* | 8/2014 | Tsai | ......................... | G06F 1/169 345/184 |
| 8,866,033 B2* | 10/2014 | Xue | ......................... | G06F 1/169 200/343 |
| 8,963,841 B2* | 2/2015 | Brooks | ................. | G06F 1/1662 345/170 |
| 11,573,645 B1* | 2/2023 | Huang | ................. | G06F 3/03547 |
| 2007/0139388 A1* | 6/2007 | Lee | ......................... | G06F 1/169 345/173 |
| 2010/0091442 A1* | 4/2010 | Theobald | ................. | H05K 5/04 361/679.55 |

(Continued)

*Primary Examiner* — Joe H Cheng
(74) *Attorney, Agent, or Firm* — Larson Newman, LLP

(57) ABSTRACT

An innovative palmrest assembly for a computer has fewer components and reduces costs. The palmrest assembly has a cover that holds a tactile pointing device (such as a touch/click pad). The cover, though, is integrally molded with a holder for the tactile pointing device. The cover thus includes a molded pocket or recess into which the tactile pointing device is inserted, perhaps in a snap-fit arrangement. Because the tactile pointing device snuggly fits into the cover, the palmrest assembly has fewer components and fastening screws may be eliminated. Moreover, the cover may further include one or more elastomeric springs that are integrally molded with the holder for the tactile pointing device. The integrally-molded elastomeric springs further reduce componentry and eliminate complicated assembly operations. When a user taps or clicks the tactile pointing device, the elastomeric springs slightly compress and then rebound, thus providing a return motion to the tactile pointing device. The elastomeric springs may be tuned in material and in shape to achieve any desired feel or experience metric.

17 Claims, 7 Drawing Sheets

(56) References Cited

U.S. PATENT DOCUMENTS

| | | | |
|---|---|---|---|
| 2011/0254788 A1* | 10/2011 | Wang | G06F 3/0338 |
| | | | 345/173 |
| 2014/0111914 A1* | 4/2014 | Leggett | H01H 11/00 |
| | | | 361/679.1 |
| 2017/0052611 A1* | 2/2017 | Komatsu | G06F 3/03547 |
| 2018/0074694 A1* | 3/2018 | Lehmann | G06F 3/0447 |
| 2019/0302839 A1* | 10/2019 | Holland | G06F 1/1616 |
| 2020/0401295 A1 | 12/2020 | Morrison et al. | |
| 2021/0240270 A1 | 8/2021 | Knoppert et al. | |
| 2021/0240282 A1 | 8/2021 | Gajiwala et al. | |
| 2022/0193538 A1 | 6/2022 | Goh et al. | |

* cited by examiner

COMPUTER TACTILE PAD MECHANISM

FIELD OF THE DISCLOSURE

This disclosure generally relates to information handling systems, and more particularly relates to pointing devices having a tactile sensor.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An innovative palmrest assembly for a computer has fewer components and reduces costs. The palmrest assembly has a cover that holds a tactile pointing device (such as a touch/click pad). The cover, though, is integrally molded with a holder for the tactile pointing device. The cover thus includes a molded pocket or recess into which the tactile pointing device is inserted, perhaps in a snap-fit arrangement. Because the tactile pointing device snuggly fits into the cover, the palmrest assembly has fewer components and fastening screws may be eliminated. Moreover, the cover may further include one or more elastomeric springs that are integrally molded with the holder for the tactile pointing device. The integrally-molded elastomeric springs further reduce componentry and eliminate complicated assembly operations. When a user taps or clicks the tactile pointing device, the elastomeric springs slightly compress and then rebound, thus providing a return motion to the tactile pointing device. The elastomeric springs may be tuned in material and in shape to achieve any desired feel or experience metric.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings.

Figure 1:
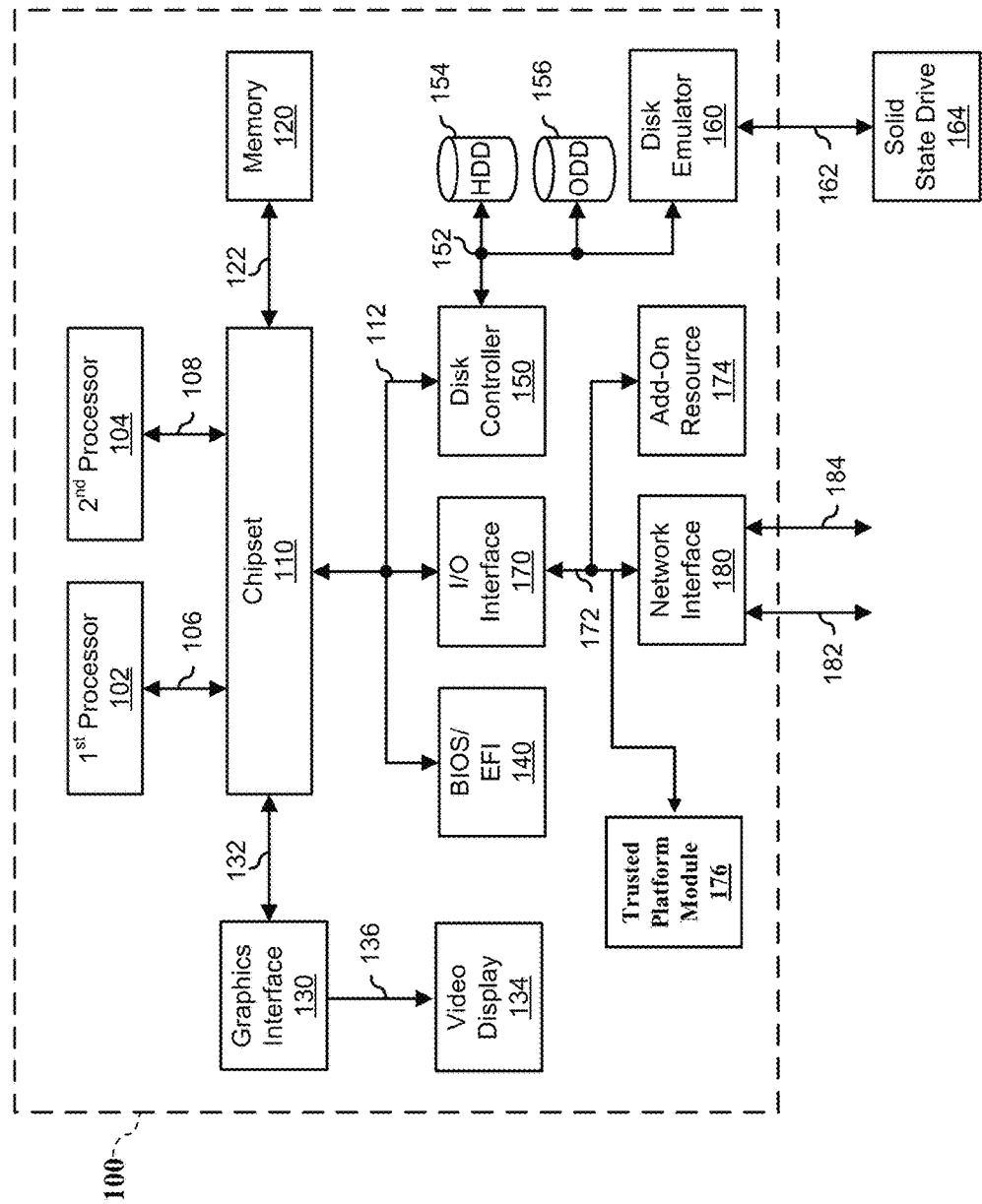
FIG. 1 illustrates an information handling system, according to exemplary embodiments.

FIG. 1 illustrates an embodiment of an information handling system 100 including processors 102 and 104, chipset 110, memory 120, graphics adapter 130 connected to video display 134, non-volatile RAM (NV-RAM) 140 that includes a basic input and output system/extensible firmware interface (BIOS/EFI) module 142, disk controller 150, hard disk drive (HDD) 154, optical disk drive (ODD) 156, disk emulator 160 connected to solid state drive (SSD) 164, an input/output (I/O) interface 170 connected to an add-on resource 174, and a network interface device 180. Processor 102 is connected to chipset 110 via processor interface 106, and processor 104 is connected to chipset 110 via processor interface 108.

Chipset 110 represents an integrated circuit or group of integrated circuits that manages data flow between processors 102 and 104 and the other elements of information handling system 100. In a particular embodiment, chipset 110 represents a pair of integrated circuits, such as a north bridge component and a south bridge component. In another embodiment, some or all of the functions and features of chipset 110 are integrated with one or more of processors 102 and 104. Memory 120 is connected to chipset 110 via a memory interface 122. An example of memory interface 122 includes a Double Data Rate (DDR) memory channel, and memory 120 represents one or more DDR Dual In-Line Memory Modules (DIMMs). In a particular embodiment, memory interface 122 represents two or more DDR channels. In another embodiment, one or more of processors 102 and 104 include memory interface 122 that provides a dedicated memory for the processors. A DDR channel and the connected DDR DIMMs can be in accordance with a particular DDR standard, such as a DDR3 standard, a DDR4 standard, a DDR5 standard, or the like. Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like.

Graphics adapter 130 is connected to chipset 110 via a graphics interface 132, and provides a video display output 136 to a video display 134. An example of a graphics interface 132 includes a peripheral component interconnect-express interface (PCIe) and graphics adapter 130 can include a four lane (x4) PCIe adapter, an eight lane (x8) PCIe adapter, a 16-lane (x16) PCIe adapter, or another configuration, as needed or desired. In a particular embodiment, graphics adapter 130 is provided on a system printed circuit board (PCB). Video display output 136 can include a digital video interface (DVI), a high definition multimedia interface (HDMI), DisplayPort interface, or the like. Video display 134 can include a monitor, a smart television, an embedded display such as a laptop computer display, or the like.

NV-RAM 140, disk controller 150, and I/O interface 170 are connected to chipset 110 via I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller 150 to HDD 154, to ODD 156, and to disk emulator 160. Disk interface 152 may include an integrated drive electronics (IDE) interface, an advanced technology attachment (ATA) such as a parallel ATA (PATA) interface or a serial ATA (SATA) interface, a SCSI interface, a USB interface, a proprietary interface, or a combination thereof. Disk emulator 160 permits a solid-state drive (SSD) 164 to be connected to information handling system 100 via an external interface 162. An example of external interface 162 includes a USB interface, an IEEE 1394 (Firewire) interface, a proprietary interface, or a combination thereof. Alternatively, SSD 164 can be disposed within information handling system 100.

I/O interface 170 includes a peripheral interface 172 that connects I/O interface 170 to add-on resource 174, to TPM 176, and to network interface device 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a sound card, data storage system, an additional graphics interface, another add-on resource, or a combination thereof. Add-on resource 174 can be on a main circuit board, a separate circuit board or an add-in card disposed within information handling system 100, a device that is external to the information handling system, or a combination thereof.

Network interface device 180 represents a network communication device disposed within information handling system 100, on a main circuit board of the information handling system, integrated onto another element such as chipset 110, in another suitable location, or a combination thereof. Network interface device 180 includes network channels 182 and 184 that provides an interface to devices that are external to information handling system 100. In a particular embodiment, network channels 182 and 184 are of a different type than peripheral channel 172 and network interface device 180 translates information from a format suitable to the peripheral channel to a format suitable to the external devices. In a particular embodiment, network interface device 180 includes a host bus adapter (HBA), a host channel adapter, a network interface card (NIC), or other hardware circuit that can connect the information handling system to a network. An example of network channels 182 and 184 include an InfiniBand channel, a fiber channel, a gigabit Ethernet channel, a proprietary channel architecture, or a combination thereof. Network channels 182 and 184 can be connected to an external network resource (not illustrated). The network resource can include another information handling system, a data storage system, another network, a grid management system, another suitable resource, or a combination thereof.

The information handling system 100 may include a baseboard management controller (BMC). The BMC is connected to multiple elements of information handling system 100 via one or more management interface to provide out of band monitoring, maintenance, and control of the elements of the information handling system. As such, BMC represents a processing device different from processors 102 and 104, which provides various management functions for information handling system 100. In an embodiment, BMC may be responsible for granting access to a remote management system that may establish control of the elements to implement power management, cooling management, storage management, and the like. The BMC may also grant access to an external device. In this case, the BMC may include transceiver circuitry to establish wireless communications with the external device such as a mobile device. The transceiver circuitry may operate on a Wi-Fi channel, a near-field communication (NFC) channel, a Bluetooth or Bluetooth-Low-Energy (BLE) channel, a cellular based interface such as a global system for mobile (GSM) interface, a code-division multiple access (CDMA) interface, a universal mobile telecommunications system (UMTS) interface, a long-term evolution (LTE) interface, another cellular based interface, or a combination thereof. A mobile device may include Ultrabook, a tablet computer, a netbook, a notebook computer, a laptop computer, mobile telephone, a cellular telephone, a smartphone, a personal digital assistant, a multimedia playback device, a digital music player, a digital video player, a navigational device, a digital camera, and the like.

The term BMC may be used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller, and embedded controllers included at the blades of the blade server can be referred to as blade management controllers. Out-of-band communication interfaces between BMC and elements of the information handling system may be provided by management interface that may include an inter-integrated circuit ($I^2C$) bus, a system management bus (SMBUS), a power management bus (PMBUS), a low pin count (LPC) interface, a serial bus such as a universal serial bus (USB) or a serial peripheral interface (SPI), a network interface such as an Ethernet interface, a high-speed serial data link such as PCIe interface, a network controller-sideband interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

In an embodiment, the BMC implements an integrated remote access controller (iDRAC) that operates to monitor and maintain system firmware, such as code stored in BIOS/EFI module 142, option ROMs for graphics interface 130, disk controller 150, add-on resource 174, network interface 180, or other elements of information handling system 100, as needed or desired. In particular, BMC includes a network interface that can be connected to a remote management system to receive firmware updates, as needed or desired. Here BMC receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC utilizes various protocols and application programming interfaces (APIs) to direct and control the processes for monitoring and maintaining the system firmware. An example of a protocol or API for monitoring and maintaining the system firmware includes a graphical user interface (GUI) associated with BMC, an interface defined by the Distributed Management Taskforce (DMTF) (such as Web Services Management (WS-MAN) interface, a Management Component Transport Protocol (MCTP) or, Redfish interface), various vendor defined interfaces (such as Dell EMC Remote Access Controller Administrator (RACADM) utility, Dell EMC Open Manage Server Administrator (OMSS) utility, Dell EMC Open Manage Storage Services (OMSS) utility, Dell EMC Open Manage Deployment Toolkit (DTK) suite), representational state transfer (REST) web API, a BIOS setup utility such as invoked by a "F2" boot option, or another protocol or API, as needed or desired.

In a particular embodiment, BMC is included on a main circuit board (such as a baseboard, a motherboard, or any combination thereof) of information handling system 100, or is integrated into another element of the information handling system such as chipset 110, or another suitable element, as needed or desired. As such, BMC can be part of an integrated circuit or a chip set within information handling system 100. BMC may operate on a separate power plane from other resources in information handling system 100. Thus BMC can communicate with the remote management system via network interface or the BMC can communicate with the external mobile device using its own transceiver circuitry while the resources or elements of information handling system 100 are powered off or at least in low power mode. Here, information can be sent from the remote management system or external mobile device to BMC and the information can be stored in a RAM or NV-RAM associated with the BMC. Information stored in the RAM may be lost after power-down of the power plane for BMC, while information stored in the NV-RAM may be saved through a power-down/power-up cycle of the power plane for the BMC.

In a typical usage case, information handling system 100 represents an enterprise class processing system, such as may be found in a datacenter or other compute-intense processing environment. Here, there may be hundreds or thousands of other enterprise class processing systems in the datacenter. In such an environment, the information handling system may represent one of a wide variety of different types of equipment that perform the main processing tasks of the datacenter, such as modular blade servers, switching and routing equipment (network routers, top-of-rack switches, and the like), data storage equipment (storage servers, network attached storage, storage area networks, and the like), or other computing equipment that the datacenter uses to perform the processing tasks.

Figure 2:
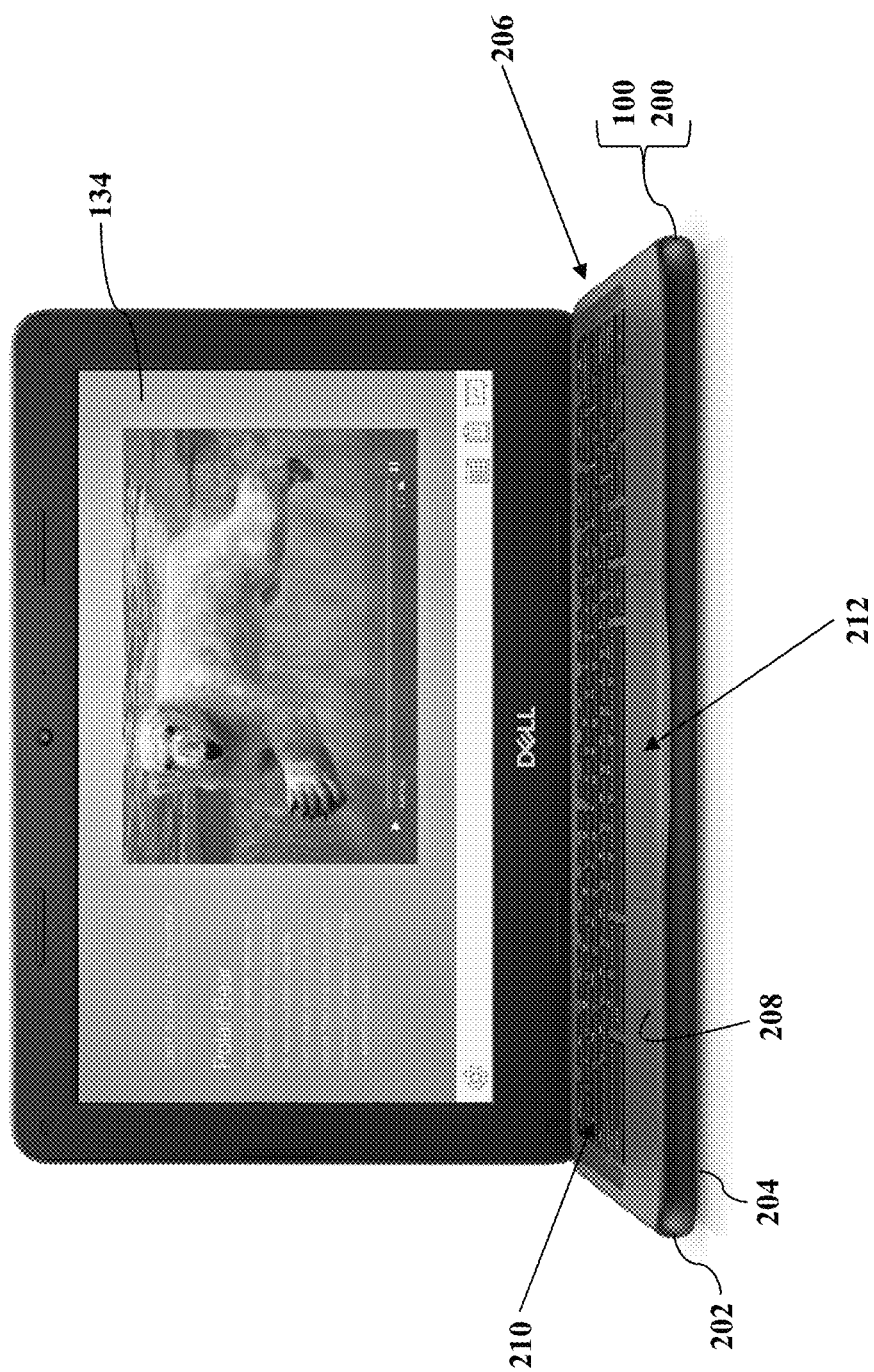
FIGS. 2-3 further illustrate the information handling system, according to exemplary embodiments.
Figure 3:
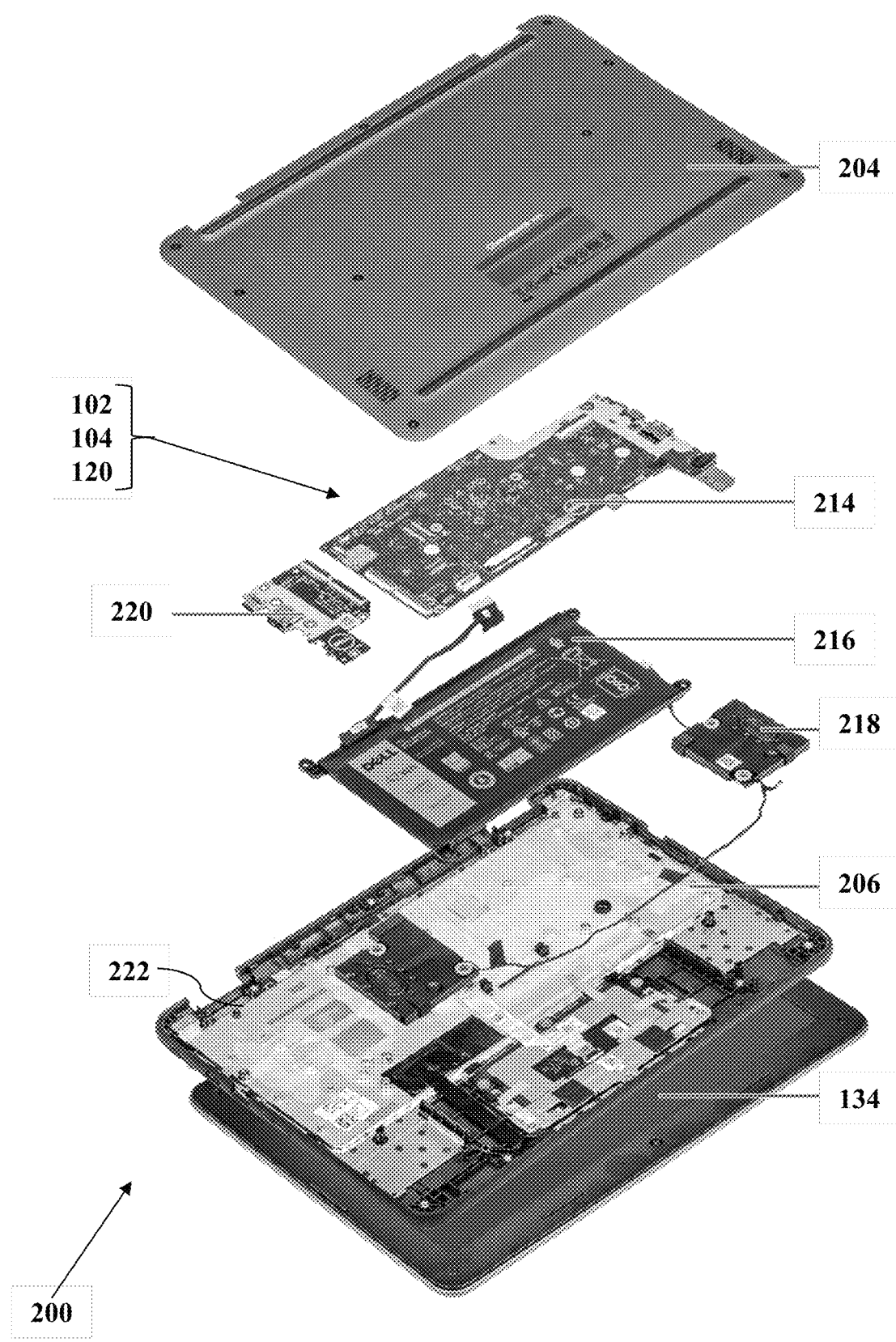

FIG. 2 shows the information handling system 100 as a mobile laptop computer 200 having an outer enclosure 202 and the display 134. The outer enclosure 202 has a bottom base cover 204 secured to an upper or top innovative palmrest assembly 206. The palmrest assembly 206 comprises a top cover 208, and the palmrest assembly 206 holds or includes the familiar keyboard 210 and the click/touch pad 212. FIG. 3 is an upside down, exploded view of the laptop computer 200 illustrating its major external and internal components. The external bottom base cover 204 may be separated from the palmrest assembly 206 (usually by screws, snaps, or other fastening system not shown for simplicity). The bottom base cover 204 may be removed to reveal a system board 214 (for example having the processors 102/104 and the memory 120), a rechargeable battery 216, one or more speakers 218, and an input/output board 220. The display 134 may be hinged to an internal chassis 222, thus allowing the laptop computer 200 to be opened and closed. These components are generally well-known, so this disclosure will not dwell on the known aspects.

Figure 4:
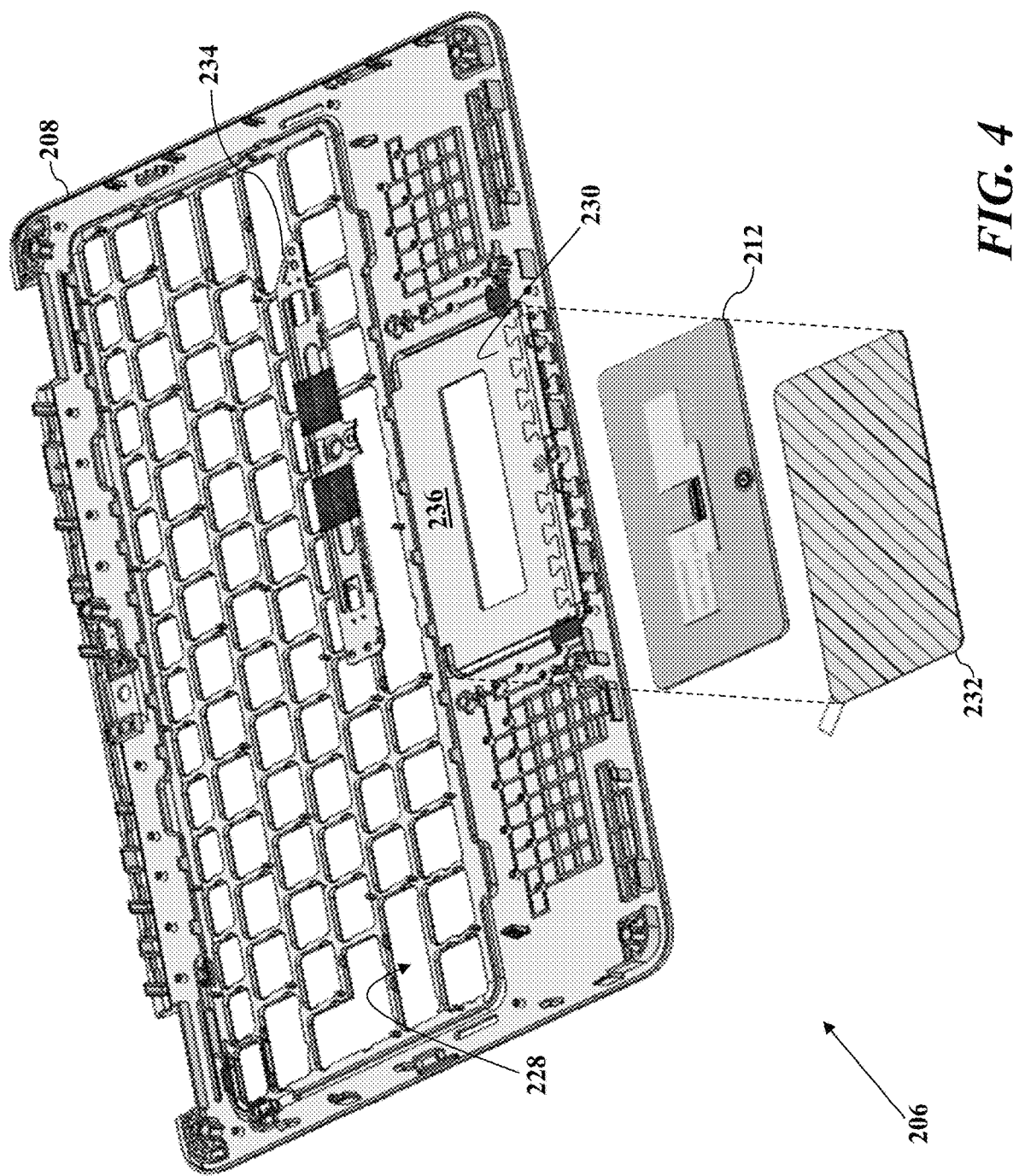
FIG. 4 is an exploded view of a palmrest assembly, according to exemplary embodiments.

FIG. 4 is an exploded view of the innovative palmrest assembly 206, according to exemplary embodiments. The palmrest assembly 206 is illustrated without the keyboard 210 (illustrated in FIG. 3). That is, the cover 208 has many molded keyholes 228 through which the individual keys of the keyboard 210 would protrude. The keyboard 210, though, is removed or separated from the palmrest assembly 206 to more clearly show the innovative features. The palmrest assembly 206 has reduced componentry for simpler assembly without sacrificing user/finger feel and performance. The click/touch pad 212 is a printed circuit board (or "PCB") that inserts or snaps into a pad holder 230 in the cover 208 of the palmrest assembly 206. A clear protective covering 232 (such as Dupont's MYLAR® polyester thin film) may be applied to or overlaid on the click/touch pad 212. The pad holder 230, though, is integrally molded in the cover 208 of the palmrest assembly 206. That is, the click/touch pad holder 230 and the cover 208 are integrally molded as a single component of the palmrest assembly 206. A pad support bracket 234 may be added to support a backside or underside 236 of the integrally-molded pad holder 230 and the cover 208. The pad support bracket 234 may be secured to the cover 208 using screws, snaps, other mechanical fasteners, or adhesive.

Figure 5:
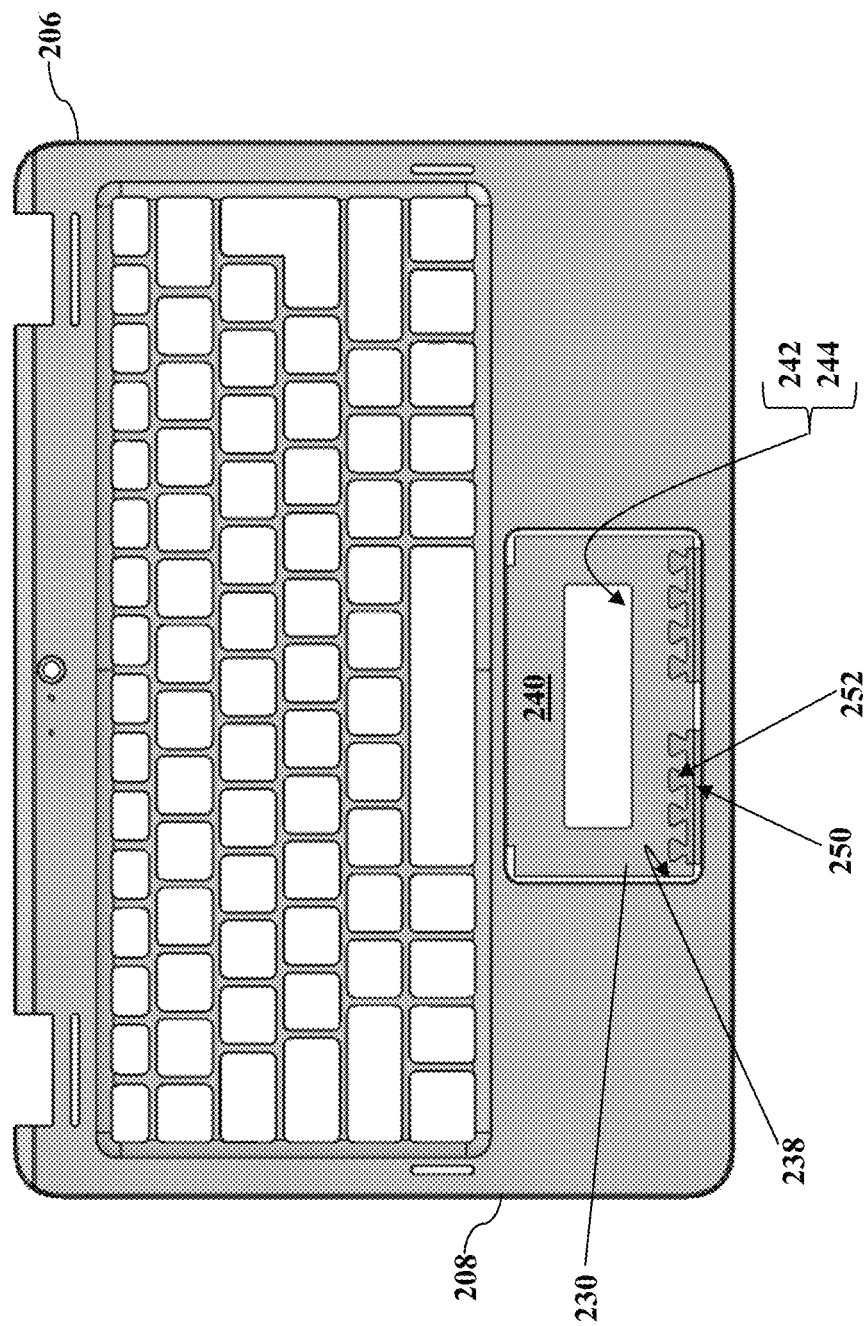
FIGS. 5-7 further illustrate the palmrest assembly, according to exemplary embodiments.
Figure 6:
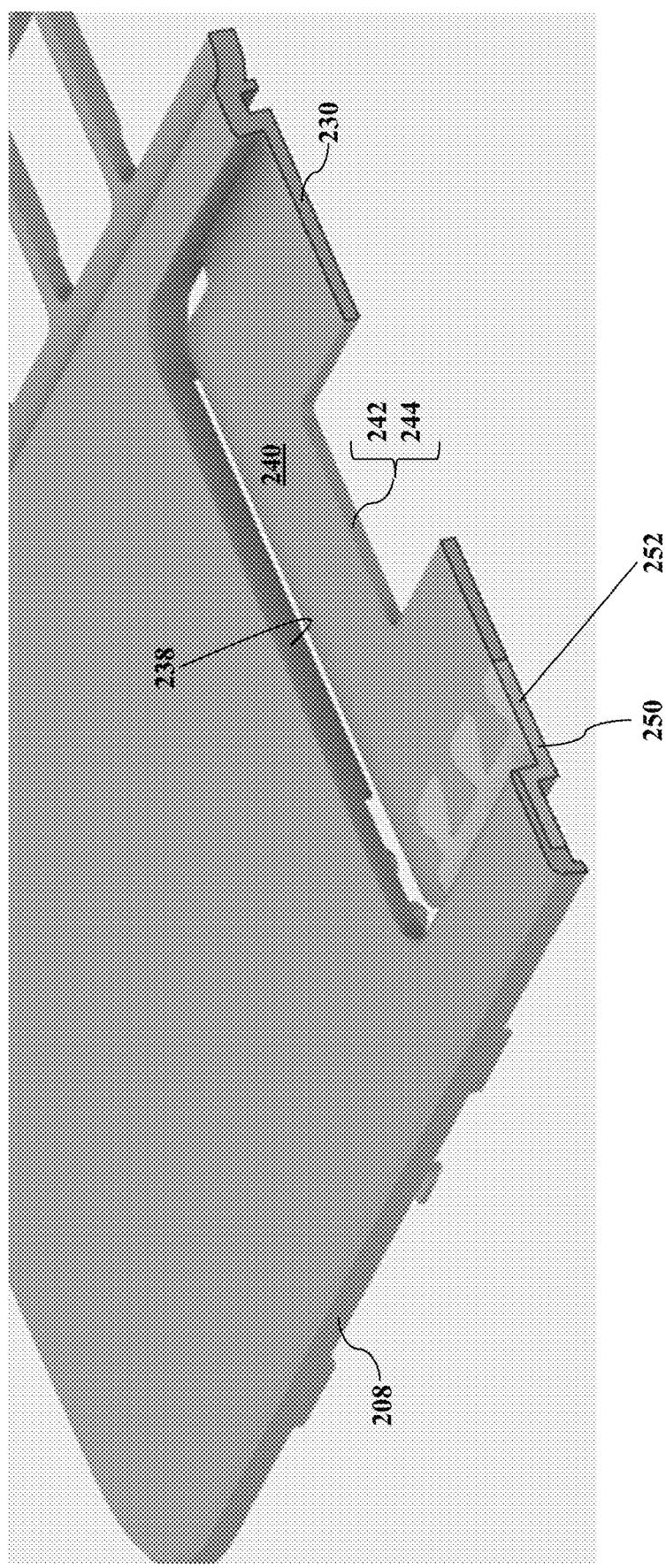
Figure 7:
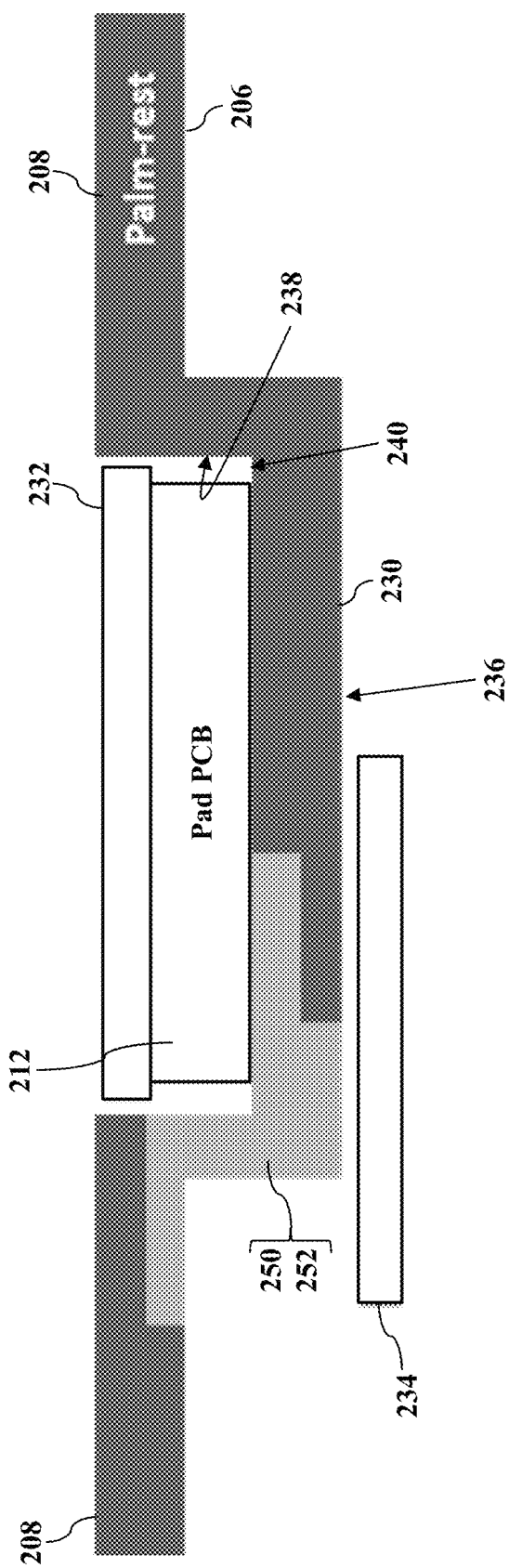

FIGS. 5-7 further illustrate the innovative palmrest assembly 206, according to exemplary embodiments. FIG. 5 illustrates the integrally-molded pad holder 230 and the cover 208. FIG. 6 is an enlarged, sectional view showing a portion of the pad holder 230 integrally molded into the cover 208. FIG. 7 is an enlarged, sectional view of the palmrest assembly 206 illustrating double-injection components. The integrally-molded click/touch pad holder 230 has a sidewall 238 defining a recessed floor 240. The pad holder 230 has a depth, width, and length sized to accept the click/touch pad 212, perhaps in a tight, slightly interference snap-fit relationship. An access aperture, opening, or window 242 in the floor 240 is defined by an outer edge 244. The window 242 is illustrated with a rectangular shape that permits through access to the touch/click pad 212 (illustrated in FIGS. 2-3), but the window 242 may have any shape that permits underside wiring connections with the pad 212.

Exemplary embodiments may include one or more molded springs 250. The user may make inputs (finger taps, click, and strokes) to the touch/click pad 212. The user's finger applies a force or pressure to predefined regions or areas of the pad 212 (such as right and left clicks), and the laptop computer 200 interprets the user's input. Actual use of the laptop computer 200 confirms that the pad 212 should bounce or spring back in response to the user's tap or click inputs. Indeed, computer manufacturers may have specifications defining acceptable values or measurements for a restorative action, motion, feel, or feedback for the pad 212. Exemplary embodiments may thus integrate the molded springs 250 into the pad holder 230. When the touch/click pad 212 is tapped or depressed, the resulting finger pressure/force depresses the pad 212 into the molded spring 250, thus also compressing the molded spring 250 arranged in the floor 240 below the pad 212.

Because the molded spring 250 has elastomeric properties, the molded spring 250 compresses and returns to its original shape/thickness, thus providing a return force and action to the pad 212. While the integrated, molded springs 250 may have any shape, number, and joining configuration, FIG. 6 best illustrates a dovetail joint 252 between the spring 250 and the pad holder 230. Because the molded spring 250 and the pad holder 230 may be molded of different materials, the dovetail joint 250 provides strong tensile strength and resists separation. The pins and tails of the dovetail joint 252 may be sized to suit any desired action, motion, feel, or feedback for the pad 212. The molded spring 250 and the pad holder 230 may additionally or alternatively be joined by adhesive, weld, or mechanical fastener.

Exemplary embodiments thus present elegant solutions for tactile pointing devices. Conventional palmrests have many components that complicate assembly and disassembly. For example, in a conventional palmrest, the pad holder and the cover are separate components, and the pad holder secures to the cover using small screws. The conventional palmrest also inserts a mechanical, metal spring between the pad holder 230 and pad support bracket 234 to provide the restorative action, motion, feel, or feedback. The conventional palmrest thus has many components, some very small, that must be sourced, made, inventoried, and assembled with great care and precision. Exemplary embodiments, instead, eliminate components by integrally molding the pad holder 230 into the cover 208. Moreover, exemplary embodiments integrally mold the spring 250 with the pad holder 230, further eliminating the components of the palmrest assembly 206. Tiny springs and screws are eliminated, costs are reduced, and assembly is far simpler. Exemplary embodiments thus present elegant solutions for tactile pointing devices.

Exemplary embodiments also maintain user feel and experience. Because a conventional palmrest has so many components, the many components have tolerance stacks that can produce negative click/touch feels, unsightly cosmetic gaps, and poor quality. The innovative palmrest assembly 206, in contradistinction, has less components, so their reduced stacking tolerances improve click/touch feels, reduce cosmetic gaps, and improve quality. Indeed, prototype testing has confirmed that the user's click/touch experience is at least equal to conventional palmrest designs in click force and travel.

Exemplary embodiments are also tunable. The pad holder 230 and the cover 208 may be molded together from the same material. Prototypes designs were formed using injection molding of thermoplastic polymers (such as polycarbonate or acrylonitrile butadiene styrene). While the integrated pad holder 230 and the cover 208 may be constructed of any material, injection molding of the pad holder 230 together with the cover 208 seemed best suited to the plastic chassis 222. The spring(s) 250 may also be tuned to suit any desired restorative action, motion, feel, or feedback. Prototype designs used a thermoplastic elastomer for the spring(s) 250 in a double-injection molding process with the integrated pad holder 230 and cover 208. The innovative palmrest 208 thus has the spring(s) 250, pad holder 230, and the cover 208 integrated and molded together as a single component. Costs are reduced, inventory is reduced, assembly is simplified, service is simplified, and the user experience is comparable.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a laptop computer, a smart phone, a tablet device or other consumer electronic device, a network server, a network storage device, a switch router or other network communication device, or any other suitable device and may vary in size, shape, performance, functionality, and price. Further, an information handling system can include processing resources for executing machine-executable code, such as a central processing unit (CPU), a programmable logic array (PLA), an embedded device such as a System-on-a-Chip (SoC), or other control logic hardware. An information handling system can also include one or more computer-readable medium for storing machine-executable code, such as software or data. Additional components of information handling system can include one or more storage devices that can store machine-executable code, one or more communications ports for communicating with external devices, and various input and output (I/O) devices, such as a keyboard, a mouse, and a video display. An information handling system can also include one or more buses operable to transmit information between the various hardware components.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A palmrest assembly for a computer, comprising:
a cover having keyholes that correspond to keys of a keyboard;

a recessed pad holder sized to accept an insertion of a tactile pad; and a spring, wherein the recessed pad holder and the spring are integrally molded with the cover such that the cover, the recessed pad holder, and the spring form a single component of the palmrest assembly.

2. The palmrest assembly of claim 1, wherein the spring includes an elastomeric spring integrally molded with the recessed pad holder as the single component of the palmrest assembly.

3. The palmrest assembly of claim 1, wherein the cover further comprises a side wall defining a depth of the recessed pad holder.

4. The palmrest assembly of claim 1, wherein the cover further comprises an integrally molded floor of the recessed pad holder.

5. The palmrest assembly of claim 1, wherein the recessed pad holder is thermoplastically molded with the cover as the single component of the palmrest assembly.

6. A palmrest assembly for a computer, comprising:
a tactile pad fabricated as a printed circuit board; and
a cover including:
  a recessed pad holder sized to accept an insertion of the tactile pad; and
  a spring, wherein the recessed pad holder and the spring are integrally molded with the cover such that the cover, the recessed pad holder, and the spring form a single component of the palmrest assembly.

7. The palmrest assembly of claim 6, wherein the cover comprises a keyhole.

8. The palmrest assembly of claim 6, further comprising a keyboard.

9. The palmrest assembly of claim 6, further comprising a holder securing the tactile pad to the cover.

10. The palmrest assembly of claim 6, wherein the spring includes an elastomeric spring injection molded with the recessed pad holder as the single component of the palmrest assembly.

11. The palmrest assembly of claim 6, wherein the cover further comprises a side wall defining a depth of the recessed pad holder.

12. The palmrest assembly of claim 6, wherein the cover further comprises an integrally molded floor of the recessed pad holder.

13. The palmrest assembly of claim 6, wherein the recessed pad holder is thermoplastically molded with the cover as the single component of the palmrest assembly.

14. An information handling system, comprising:
a processor; and
an enclosure housing the processor, the enclosure including a bottom base cover secured to a palmrest assembly, the palmrest assembly having:
  a tactile pad fabricated as a printed circuit board; and
  a cover including:
    a recessed pad holder sized to accept an insertion of the tactile pad; and
    a spring, wherein the recessed pad holder and the spring are integrally molded with the cover such that the cover, the recessed pad holder, and the spring form a single component of the palmrest assembly.

15. The information handling system of claim 14, wherein the cover further comprises keyholes.

16. The information handling system of claim 15, further comprising a keyboard having keys protruding through the keyholes.

17. The information handling system of claim 14, wherein the spring includes an elastomeric spring injection molded with the recessed pad holder as the single component of the palmrest assembly.

* * * * *